(12) United States Patent
Wesby

(10) Patent No.: US 6,317,602 B1
(45) Date of Patent: Nov. 13, 2001

(54) SIGNAL PROCESSING SYSTEM FOR LOCATING A TRANSMITTER

(75) Inventor: Philip Bernard Wesby, Norfolk (GB)

(73) Assignee: Nokia Telecommunications Oy, Nokia Group (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,459
(22) PCT Filed: Feb. 10, 1997
(86) PCT No.: PCT/GB97/00364
§ 371 Date: Nov. 16, 1998
§ 102(e) Date: Nov. 16, 1998
(87) PCT Pub. No.: WO97/29386
PCT Pub. Date: Aug. 14, 1997

(30) Foreign Application Priority Data

Feb. 8, 1996 (GB) .................................. 9602559

(51) Int. Cl.[7] .................................................. H04Q 7/20
(52) U.S. Cl. ....................... 455/456; 342/357.01; 342/451
(58) Field of Search .................................. 455/456, 457, 455/458, 517, 524, 525; 342/357.01, 357.06, 357.1, 457, 451

(56) References Cited

U.S. PATENT DOCUMENTS

| 5,051,741 | 9/1991 | Wesby . | |
|---|---|---|---|
| 5,208,756 | 5/1993 | Song . | |
| 5,317,323 | 5/1994 | Kennedy et al. . | |
| 5,327,144 | * 7/1994 | Stilp et al. | 342/457 |
| 5,381,444 | 1/1995 | Tajima . | |
| 5,512,908 | * 4/1996 | Herrick | 342/387 |
| 5,758,288 | * 5/1998 | Dunn et al. | 455/456 |
| 5,812,522 | * 9/1998 | Lee et al. | 455/456 |
| 5,883,598 | * 3/1999 | Parl et al. | 342/457 |
| 5,987,329 | * 11/1999 | Yost et al. | 455/456 |

FOREIGN PATENT DOCUMENTS

| 0 310 939 | 4/1989 | (EP) . |
|---|---|---|
| 528 627 | 2/1993 | (EP) . |
| 2 283 142 | 4/1995 | (GB) . |
| WO 91/16639 | 10/1991 | (WO) . |

OTHER PUBLICATIONS

UK search report dated 24 Mar. 1997.

* cited by examiner

Primary Examiner—Edward F. Urban
(74) Attorney, Agent, or Firm—Merchant & Gould P.C.

(57) ABSTRACT

A signal processing system is provided which describes a method and apparatus to determine the absolute time of arrival of a transmitted signal and to determine the location of a transmitting device by determining the relative difference in time that a transmitted signal is received at three or more receivers which are spaced apart with respect to each other. The method and apparatus is applicable to all systems which transmit discrete signals or signals which comprise composite components. The system comprises a ramp detection component to track the arrival of the signal and to determine, to a high time resolution, the arrival of a signal by identifying a particular feature of the transmitted signal. The time-of-arrival of the signal is determined with reference to a timing circuit. Each receiver further comprises a timing-synchronisation component to maintain a highly accurate clock by using an accurate timing reference such as the timing signals transmitted by the Global Positioning System constellation of satellites. In one embodiment the method is applicable to the transmission of discrete signals according to the protocol of a packet switching network.

19 Claims, 1 Drawing Sheet

RECEIVER SIGNAL PROCESSING SCHEMATIC

SIGNAL PROCESSING SYSTEM FOR LOCATING A TRANSMITTER

BACKGROUND OF THE INVENTION

Signal processing methods which determine the time-of-arrival of signals are well known. It is known to read frequency modulated coded signals and to determine a time of arrival of these signals to the time resolution given by the inverse of the bandwidth of the signal. To date, no signal processing methods and apparatuses have been described which can improve upon this resolution by analysing the signal in terms of its composite components.

Packet switching networks are known such as modacom and Mobitex. These networks are exclusively operated as messaging networks and they operate according to a structured protocol in which remote units request transmission windows to communicate with the nearest processing base station. The transmitted data packets are of very short duration and each comprises identification code information identifying the unit from which the message was sent. To date, no methods have been proposed to analyse the signals transmitted by remote units operating in accordance with said packet switching networks and thus provide a positioning capability to the packet switching network's messaging capability.

Conventional networks determine the approximate location of GSM telephones and personal message pagers to the resolution of a cell based upon the signal strength of their transmissions. Communication channels are allocated to that base station which receives the strongest signal from the transmitting unit. Conventional networks do not process signals to determine the location of transmitting units to a high resolution.

Furthermore, no signal processing system is presently available which serves to analyse a discrete signal in terms of its composite components and thereby greatly improve upon the bandwidth limitation on the determination of the time-of-arrival of the signal whereby a coded signal can be determined to a time resolution given by the inverse of the bandwidth. Moreover, no signal processing system of this type is known which also serves to determine the position of a remote transmitting unit by differential comparison of the time-of-arrival of the signal at a plurality of receivers in such a simple and effective manner as herein proposed

SUMMARY OF THE INVENTION

Accordingly, it is an object of the present invention to provide a novel signal processing system which serves to provide a highly accurate measure of the time of arrival of a discrete coded signal comprising composite component attributes.

It is a further object of the present invention to provide such a signal processing system method and apparatus which is both efficient and effective in its processing algorithm.

It is a further object of the present invention to provide the means to make use of a differential time measurement technique which is applicable for positioning purposes by gathering information from a plurality of receivers that analyse either a discrete coded signal such as that transmitted according to the protocol of a packet switching network, wherein said signal comprises component parts, or a continuously transmitted coded signal comprising composite component parts.

It is a further object of the present invention to provide a signal-processing system comprising a time-measurement technique that is applicable to the transmission protocol of a packet switching network such as that used by the paged area network as described in U.S. Pat. No. 5,051,741 (Wesby).

BRIEF SUMMARY OF THE INVENTION

Certain of the foregoing and related objects are readily-attained according to the present invention by the provision of a signal processing system which includes the means to receive a discretely transmitted coded signal at one or more receiving means such as that transmitted is according to the protocol of a packet switching network wherein the signal is composed of composite parts which may comprise a frequency modulated signal ramp of increasing amplitude from zero to a maximum followed by a frequency modulated data stream of digital bits.

1. The invention of the signal processing system relates to a method and apparatus for determining the time of arrival of a coded signal.

2. More particularly, it relates to a signal processing method and apparatus to determine the arrival of a discrete coded signal comprising differing composite components such as signals used for transmitting data over a data bus operating according to the protocol of a packet switching network.

3. Furthermore, the invention relates to a signal processing method and apparatus for identifying discrete components of a transmitted coded signal for determining the time-of-arrival of this coded signal.

4. Furthermore, the system relates to a method for comparing the difference in time of arrival of a signal at a number of receiving stations wherein the signal may comprise a discrete coded signal such as that used in packet switching networks or a continuously transmitted signal comprising differing component parts which can be readily identifiable by the receiving means.

Alternatively the signal may comprise a continuously transmitted signal which includes a train of composite signal components such that the arrival of the is coded signal can be time-determined relative to one of these components.

Alternatively and including the above examples, the signal may be transmitted using one or more of any transmission mediums including any possible encoding.

In all cases, the receiver divides the signal into its component parts and recognises the components of the signal. In the particular case of a discrete coded signal transmitted according to the protocol of a packet switching network, the receiver tracks the arrival of the signal as it traces a frequency-modulated bandwidth-limited ramp, increasing in amplitude up to the maximum operational amplitude, which is frequency modulated according to known data modulation principles with a specified bandwidth about a carrier frequency.

Furthermore, the receiver identifies the rate of change of the amplitude of the signal as it increases up to a maximum amplitude.

Furthermore, the receiver stores the transmitted coded signal and analyses it subsequent to storage. Furthermore the receiver provides a highly accurate timing reference such that the time of arrival of the transmitted coded signal may be determined to a very high time-resolution.

A master station communicates with the network of receiving stations to determine which of the receiving stations has determined a time-of-arrival of a coded signal transmitted from a remote transmitter.

The invention relates to using the analogue part of a signal containing coded information, whatever the form, in order to determine the time-of-arrival of this signal, regardless of the carrier frequency, the coding of the signal (PSK, FSK, etc.) and regardless of the data contained in the signal. The method according to the invention is applicable to all signals whose characteristics are known.

Furthermore, the master station communicates periodically with each of the plurality of receiving stations to determine the exact difference in time between the master station's own timing means and each receiver's timing means in order that the master station is able to combine time-of-arrival information from different receivers wherein each receiver has its own unique time reference.

Furthermore, each received coded signal, transmitted from a remote transmitter, whose time-of-arrival is determined by one of each of a plurality of receivers spaced throughout an area from within which said signal is transmitted, is processed by a master station which receives said encoded time-of-arrival information from each of the plurality of receivers which received the said coded transmission and combines said information differentially, knowing the relative positions of each of the receivers, and knowing the difference in time between the master station's own timing means and each of the receiver's timing means such that the master station may determine a position from which the transmission was sent relative to the plurality of receivers that received said coded signal.

Said receivers are spaced throughout a coverage area. Each of the receivers may be fixed or in motion. Each receiver which determines the time of arrival and identification code by separating it from other information of a signal transmission, passes this information to the master station when directed to do so. In the instance that the receivers are fixed, the master station knows the relative separation of each of the plurality of receivers spread throughout said coverage area and the master station's own position relative to each of said plurality of receivers. In the instance that the receivers are in motion, either relative to each other or to the master station, or relative to both each other and the master station, means exist at the master station to determine the instantaneous relative separation of the receivers with respect to each other and their individual relative separation with respect to the master station at the instant that the coded transmitted signal is received at each of the receivers that received said coded signal.

The master station maintains an accurate timing reference such as that provided by the GPS (Global Positioning System) constellation of satellites, an atomic clock or other such means. Furthermore, the master station determines and updates the relative difference between the master station's own timing reference, and that as determined by each of the plurality of receivers such that the master station is able to combine timing information from different receivers differentially and thereby determine the position from which a coded signal is sent.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention and the invention is not limited to this exemplary embodiment.

DESCRIPTION OF A PREFERRED EMBODIMENT

Figure 1:
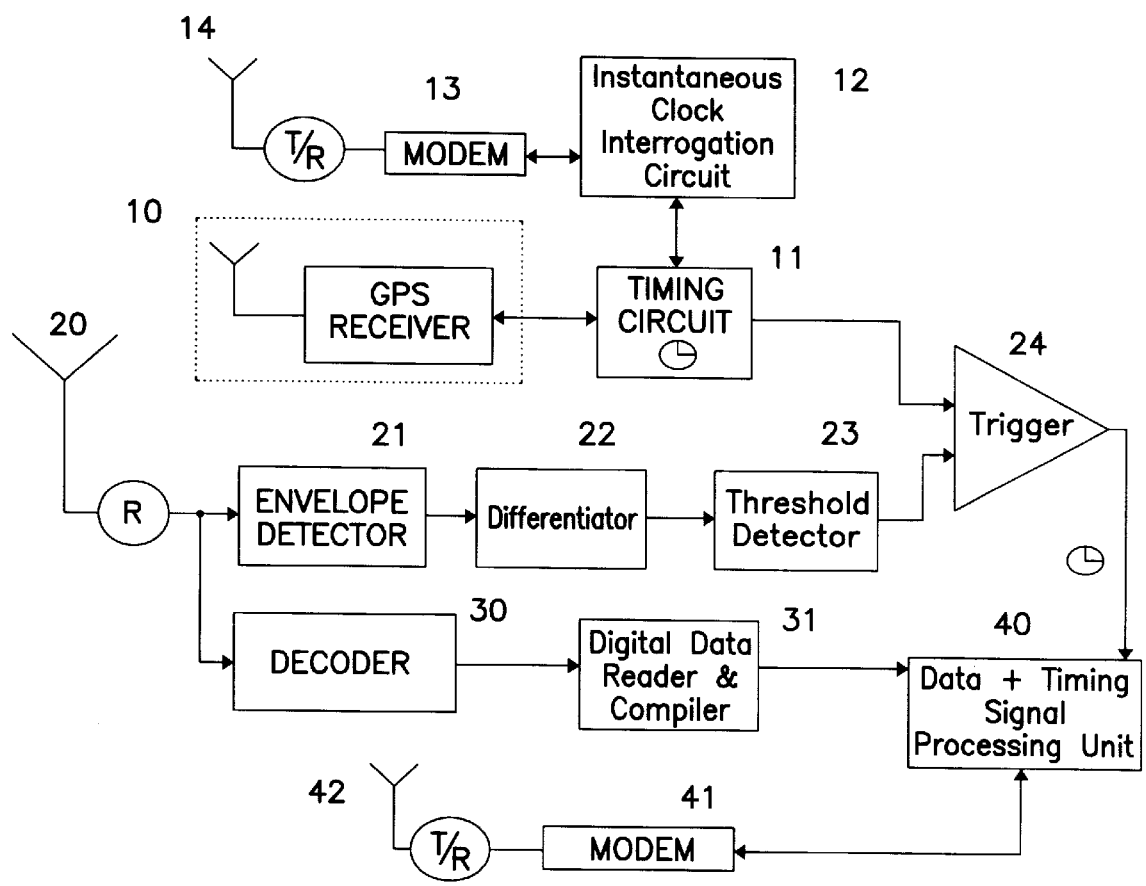
FIG. 1 is a figurative schematic of the component parts of a receiver used in association with the method and apparatus of the present invention.

Referring now in detail to the drawing denoted FIG. 1, therein illustrated is a figurative schematic of the component parts of a receiver used in association with the method and apparatus of the present invention. The schematic is to be interpreted in the widest sense such that each component part of the schematic comprises a power supply where appropriate and error-correcting circuitry which may further comprise data processing units and memory. Furthermore, the antennas shown may be replaced by fewer antennas where appropriate. Duplication of components is provided to make it easier to understand the schematic.

With reference to the operation of the receiver, the transmitted signal that is received by the receiver comprises a ramp modulated at the carrier frequency, transmitted over a time window such that the amplitude of the signal increases up to a maximum threshold such that users of adjacent frequency bands do not experience interference. This ramp signal is followed by a digital data stream, frequency-modulated about the carrier frequency with a bandwidth B. This digital data stream comprises a coded signal such as an identification code of the transmitting device.

The schematic comprises four main signal-processing-components: timing-synchronisation; ramp-detection; signal-decoding; and communication with the master station.

In the preferred embodiment, the timing-synchronisation signal-processing-component comprises a global positioning system unit 10 to control the receiver's own internal timing means 11 thereby providing the receiver with the ability to maintain a highly accurate timing means at a high timing resolution. Furthermore, the timing synchronisation component comprises the means 12, 13, 14 to output an instantaneous clock value for transmission to the master station such that the master station can determine the difference in time between the master station's own timing means and the timing means of each receiver.

In the preferred embodiment, the ramp-detection signal-processing-component comprises an antenna 20, which passes signals to an envelope detector 21 which outputs signals to a differentiator 22 such that the output is a measure of the rate of change in amplitude of the ramp signal. The output of the differentiator 22 is subsequently passed to a threshold detector 23 which is designed to identify a particular threshold condition such that when this condition is identified, the threshold detector 23 then passes a signal to a trigger circuit 24 which then reads the instantaneous value of the timing circuit 11 and passes this to a signal processing circuit 40.

In the preferred embodiment, the signal-decoding signal-processing-component comprises an antenna 20, which passes signals to a decoder 30 for transmission to a digital data reader and compiler 31 in which signals are analysed and compared with particular sought transmissions is and subsequently complied into a format to be transmitted to signal processing unit 40.

In the preferred embodiment the means to communicate with the master station comprises a signal processing unit 40 a modem 41, and an antenna 42, whereby time-of-arrival signals are compiled with identification signals and encoded before transmission to the master station.

The receiver determines the threshold condition based upon the design parameters of the threshold detection circuits. The threshold condition is determined from the relative change in amplitude of the signal and not from absolute amplitude. Although the ramping signal is subject to noise and may be slightly different from unit to unit, the same signal is picked up at three or more receivers and each of the receivers is designed to trigger a threshold condition based upon the same design parameters. In this way the trigger-threshold time resolution becomes dependent upon the design parameters of the receiving circuitry and not directly upon the bandwidth of the transmitted signal. Noise will affect the resolution if the signal to noise ratio is low around the trigger threshold but this will be the same for each receiver. The noise will be displaced in time but it will not be of such short duration that it will affect the threshold condition of each receiver differentially.

It is necessary to adapt the threshold detector for local noise conditions. This is done by mathematically analysing the power of the noise. Equations for the noise power are derived in which noise is modelled as a normal variable. Based upon these equations the threshold level is determined so that the circuit operates acceptably, in the given noise environment. The analytical result may be used to design time threshold detectors for other environments.

Although this signal processing system has been described with regard to a time of arrival determination method making use of the differential amplitude of the signal, it is also possible to achieve the same result by analysing the phase characteristic of the signal in which case the envelope detector 21, the differentiator 22, and the threshold detector circuitry are replaced with circuitry designed to analyse the phase characteristic.

Thus the position of the transmitting unit is determined by differentially comparing the trigger threshold times as determined by a plurality of receivers.

The master station measures and periodically updates the difference in time between its own accurate internal clock and the accurate clock of each of the receivers. When the master station receives a timing signal as measured by one of the receivers, it corrects this time by the difference between its own clock and the clock of the particular receiver to determine an absolute measure of the time of the threshold condition as measured by that particular receiver. The master station determines the difference in threshold condition time as measured by three or more receivers for the same transmitted signal from a mobile transmitting unit to determine a position for said mobile transmitting unit.

Although the signal processing system has been described with reference to the specific application of measuring the times of arrival of discrete coded signals as transmitted according to the protocol of a packet switching network, it will be clear to anyone skilled in the design of such signal processing systems that it can be designed in respect of any signal transmission system wherein each transmitted signal comprises encoded composite components any of which may be used to determine the relative distances of each of the receiving receivers to the place of transmission.

While only one embodiment of the present invention has been shown and described, it will be obvious to those persons of ordinary skill in the art, that many changes and modifications may be made thereunto, without departing from the spirit and scope of the invention.

What is claimed is:

1. A network of communication stations each comprising a receiver and a transmitter, spaced throughout a paged area, communicating with a master station to determine the position of a remote moveable transmitting unit, comprising at each communication station, a signal processing system for determining the time of arrival of a discretely transmitted coded signal from within said paged area, composed of composite parts, said signal processing system characterised in that it comprises:

a ramp-detection means for tracing a frequency-modulated bandwidth-limited ramp further comprising; an antenna (20) which passes frequency-modulated signals to an envelope detector (21) for detecting a bandwidth-limited ramp, increasing in amplitude up to the maximum operational amplitude which outputs signals to a differentiator (22) which measures the rate of change in the amplitude of the ramp signal and the output of which is passed to a threshold detector (23) designed to identify a particular threshold condition such that when this condition is identified, the threshold detector (23) then passes a signal to a trigger circuit (24) which then reads the instantaneous value of internal timing means (11) and passes said instantaneous value to a signal processing circuit (40), and a timing-synchronisation signal-processing means comprising an accurate timing means to control the receiver's own internal timing means (11) thereby providing the receiver with the ability to maintain a highly accurate timing means (11) at a high timing resolution, which outputs an instantaneous clock value to said trigger circuit (24) for transmission to the master station such that the master station can determine the difference in time between the master station's own timing means and the timing means of each communication station.

2. The network of communicating stations according to claim 1 wherein said network is either a packet switching network or a mobile communication infrastructure such as GSM.

3. The network of communication stations according to claim 1 wherein the signal processing system further uses the analogue part of a demodulated received signal containing coded information, in order to determine the time-of-arrival of this signal, regardless of the carrier frequency, the coding of the signal and regardless of the data contained in the signal.

4. The network of communicating stations according to claim 1 further characterised in that the master station determines the difference in threshold condition time as measured by three or more receivers each at a different communication station, for the same transmitted signal from a mobile transmitting unit to determine the position of said mobile transmitting unit.

5. The network of communication stations according to claim 4 wherein the master station communicates periodically with each of the plurality of receiving stations to determine the exact difference in time between the master station's own timing means and each of three or more receiver's timing means (11) corresponding to a remote transmitting unit, in order that the master station is able to combine time-of-arrival information from said different receivers wherein each of said receivers has its own unique time reference.

6. The network of communication stations according to claim 5 wherein at least one of said receivers are in motion.

7. The network of communication stations according to claim 6 wherein said master station comprises means for determining the instantaneous relative separation of said receiver in motion and said three or more receivers each at a fixed communication station, with respect to each other and their individual relative separation with respect to the master station at the instant that the coded transmitted signal is received at each of the receiver of said communication stations that received said coded signal.

8. The network of communication stations according to claim 1 wherein a plurality of moveable units comprise means for communicating with said three or more receivers each at one of said communication station in order to provoke the transmission of the calculated time of arrival and the relative position of each of said receivers at each communication station, and means for further locally calculating its own position.

9. The network of communication stations according to claim 8 wherein said plurality of moveable units transmit their position to the master station via the communication stations.

10. A method for determining the time of arrival of a discretely transmitted coded signal composed of composite parts from within a network of communication stations each comprising a receiver and a transmitter, spaced throughout a paged area, communicating with a master station to determine the position of a remote moveable transmitting unit, comprising the steps of:

receiving a transmitted signal sent by a moveable unit in response to a paging signal, the transmitted signal being received by at least three receivers, each located in one communication station, tracing a frequency-modulated bandwidth-limited ramp by a ramp-detection means, passing the frequency-modulated signals to an envelope detector (21) for detecting a bandwidth-limited ramp, increasing in amplitude up to the maximum operational amplitude, measuring the rate of change in the amplitude of the ramp signal by a differentiator (22), the output of which is passed to a threshold detector (23), identifying a particular threshold condition by said threshold detector (23), such that when this condition is identified, the threshold detector (23) passes a signal to a trigger circuit (24), reading the instantaneous value of internal timing means (11) and passing said instantaneous value to a signal processing circuit (40).

11. The method for determining the time of arrival of a discretely transmitted coded signal composed of composite parts according to claim 10 wherein said step of passing said instantaneous value to a signal processing circuit (40) comprises the steps of:

controlling the receiver's own internal timing means (11) by an accurate timing means such as a global positioning system unit (10), thereby providing the receiver with the ability to maintain a highly accurate timing means (11) at a high timing resolution, providing an instantaneous clock value from said highly accurate timing means (11) to a trigger circuit (24) for transmission to the master station, and passing said instantaneous clock value to a signal processing circuit (40).

12. The method for determining the time of arrival of a discretely transmitted coded signal composed of composite parts according to claim 10 further comprising the steps of:

combining the time of arrival and data processed by each of said communication stations in order to transmit this information to said master station by the processing unit (40), transmitting said information to said master station from each of said receivers of each of said communication station.

13. The method for determining the time of arrival of a discretely transmitted coded signal composed of composite parts according to claim 12 further comprising the steps of:

determining the difference in threshold condition time as measured by three or more receivers each at a different communication station, for the same transmitted signal from a mobile transmitting unit by said master station, determining the position of said mobile transmitting unit by said master station.

14. The method for determining the time of arrival of a discretely transmitted coded signal composed of composite parts according to claim 13 further comprising the steps of:

periodically communicating with each of said plurality of said communication stations, determining the exact difference in time between said master station's own timing means and each receiver's timing means (11), storing the update of relative timing differences for each one of said communication station.

15. The method for determining the time of arrival of a discretely transmitted coded signal composed of composite parts according to claim 12 further comprising the step of:

determining the instantaneous relative separation of a plurality of moving receivers, with respect to one another and their individual relative separation with respect to the master station at the instant that the coded transmitted signal is received at each of said receiver that received said coded signal.

16. The method for determining the time of arrival of a discretely transmitted coded signal composed of composite parts according to claim 12 further comprising the steps of:

communicating with said three or more receivers one at each one of said communication station in order to provoke the transmission of the calculated time of arrival and the relative position of each of said moving receivers, provoking the transmission of the calculated time of arrival and the relative position of each of said receivers at each communication station by said receivers, calculating its own position locally.

17. The method for determining the time of arrival of a discretely transmitted coded signal composed of composite parts according to claim 16 further comprising the step of:

transmitting the position of said moveable unit to the master station via the communication stations on request by said master station.

18. The network of communication stations according to claim 1, wherein the accurate timing means is a global positioning system.

19. A communication station comprising a receiver and a transmitter arranged to communicate with a master station to determine the position of a remote moveable transmitting unit, said communication station further comprising, a signal processing system for determining the time of arrival of a discretely transmitted coded signal from within a paged area, composed of composite parts, said signal processing system comprising:

a ramp-detection means for tracing a frequency-modulated bandwidth-limited ramp further comprising; an antenna (20) which passes frequency-modulated signals to an envelope detector (21) for detecting a bandwidth-limited ramp, increasing in amplitude up to the maximum operational amplitude which outputs signals to a differentiator (22) which measures the rate of change in the amplitude of the ramp signal and the output of which is passed to a threshold detector (23) designed to identify a particular threshold condition such that when this condition is identified, the threshold detector (23) then passes a signal to a trigger circuit (24) which then reads the instantaneous value of a timing means (11) and passes said instantaneous value to a signal processing circuit (40), and a timing-synchronisation signal-processing means comprising an accurate timing means to control the receiver's own internal timing means (11) thereby providing the receiver with the ability to maintain a highly accurate timing means (11) at a high timing resolution, which outputs an instantaneous clock value to said trigger circuit (24) for transmission to the master station such that the master station can determine the difference in time between the master station's own timing means and the timing means of said communication station.

\* \* \* \* \*